Aug. 30, 1927.

J. MULDER 1,640,716

TIMING DEVICE

Filed Sept. 14, 1925

INVENTOR
Jertje Mulder.

BY Clayton E. Wyrick.
ATTORNEY

Patented Aug. 30, 1927.

1,640,716

UNITED STATES PATENT OFFICE.

JENTJE MULDER, OF DETROIT, MICHIGAN.

TIMING DEVICE.

Application filed September 14, 1925. Serial No. 56,175.

This invention relates to timing devices for toasters and the like, and particularly relates to timing devices for toasters in which the toast supports are pivotally movable between a working position and one in which the toast may be placed upon or removed from said supports.

It is an object of the invention to provide a timing latch mechanism for a toaster comprising a regulable air dashpot of simple and inexpensive construction.

Another object of the invention is to equip a toaster or the like with an automatically releasable latch adapted to take effect after a predetermined time interval, and permitting shifting of the toast support (or supports) from its (or their) toasting position at the expiration of such interval.

These and various other objects will be apparent from the following description wherein reference is made to the accompanying drawings illustrating a preferred embodiment of my invention.

Figure 1:
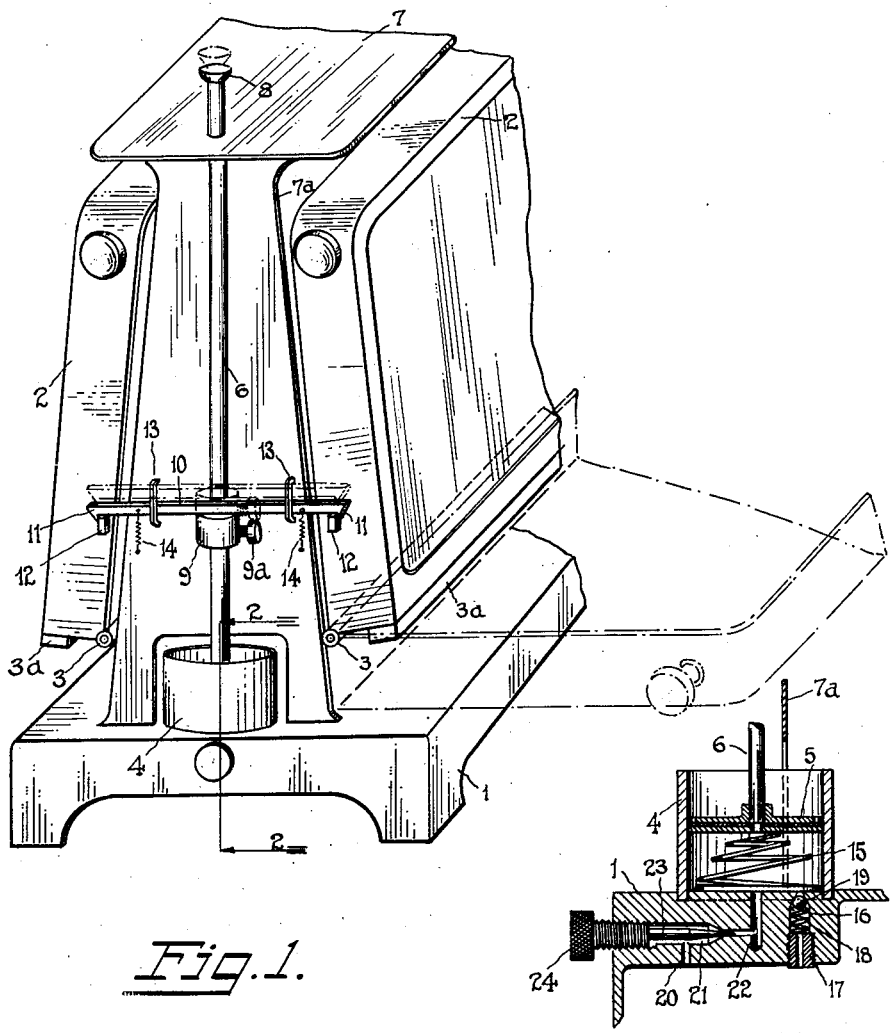
Figure 1 is a perspective view of an end portion of a toaster equipped with the improved timing device.
Figure 2:
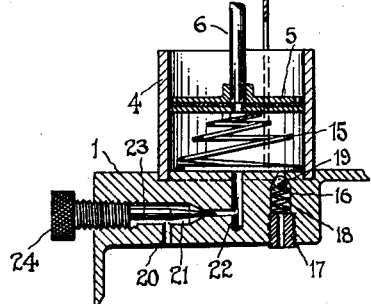
Figure 2 is a view in vertical sectional elevation of the dash pot of said device, showing particularly the means for regulating the action of said dash pot.

In these views, the reference character 1 designates the base of a well known form of toaster and 2 a pair of holders for the toast pivotally mounted upon said base, as indicated at 3, and adjustable between the raised positions of use shown in full lines in Figure 1, and lowered positions, one of which is illustrated in dash lines in said figure, in which the toast may be placed upon or removed from said holders. Said holders are weighted as indicated at 3ª or otherwise subjected to a force urging them pivotally downward from their raised working positions.

To the base 1, at one end thereof, there is secured in any suitable manner a cylindrical dash pot 4 within which works a piston 5 fast upon the lower end of a plunger rod 6. The upper end portion of said rod is guided in a top plate 7 which is mounted fast upon said base by a pair of suitable end uprights, one of which is indicated at 7ª, and preferable a head or button 8 is provided upon the upper end of said rod to facilitate manual actuation of said rod downwardly.

At a suitable height, the rod 6 rigidly carries a collar 9, adjustable by a set screw 9ª, which engages beneath a latch bar 10 horizontally disposed in a transverse relation to the toaster and formed upon both of its ends with latch heads 11, which when the toast holders are in their raised positions, are engageable with lugs 12 projecting from corresponding ends of said holders for maintaining the specified positions. Said latch bar is mounted in a pair of keepers 13 upon the adjacent upright 7ª and is adjustable in said keepers between the lowered position of latch engagement with the lugs 12, shown in full lines in Figure 1 and the raised position of disengagement from said lugs shown in dash lines in said figure. A pair of tension springs 14 connecting said latch bar to the upright 7ª urge said bar downwardly and into normal engagement with the lugs 12. Within the dash pot cylinder 4, a coiled spring 15 is arranged beneath the piston 5 to exert upward pressure upon the latter, this pressure being adapted to act through the rod 6 and collar 9 upon the latch bar 10 to establish the released or raised position of said bar.

For venting air from the dash pot, a passage 16 is formed in the base 1 upwardly opening into the dash pot and downwardly discharging through said base. In the lower portion of said passage there is retained a ported plug 17 above which is compressed a coiled spring 18 seating a ball check valve 19 in the upper end portion of said passage. Said valve is adapted to open freely for the discharge of air from the dash pot upon the downstroke of the piston but permits no admission of air to the dash pot by way of the passage 16.

For admitting air to the dash pot at a regulable rate, there is provided a passage 20, 21, 22, the intermediate portion 21 of which is formed with a seat for a needle valve 23 having a portion in screw threaded engagement with the base and having said portion projecting from the base and being provided with a suitable actuating head 24. By properly adjusting said valve with relation to its seat the inflow of air to the dash pot may be regulated to cause such retardation of upward travel of the piston 5 as may be required.

In the operation of the described invention, after the toast holders have been filled and swung to their raised or working positions, the timing mechanism is adjusted by simply depressing the plunger rod 6. The resulting lowering of the piston 5 compresses the spring 15 and produces an expulsion of air from below the piston by way of the passage 16. The tendency of the spring 15 is to raise the piston 5 and rod 6 when said rod is released, but upward travel of said piston and rod can occur only as fast as air is again admitted below the piston. Since the check valve 19 seats against any entrance of air to the dash pot, the only inflow must be through the passage 20, 21, 22. Said passage is so restricted by the needle valve 23 that air may enter the dash pot only at a predetermined gradual rate such that the toast will have been browned to exactly the desired extent before the rise of the rod 6 will effect release of the holders 2 and permit the same to be swung downwardly by their counterbalancing weights $3^a$.

From the preceding description it will appear that the timing mechanism is of simple and inexpensive construction and easy to operate and is readily regulable to vary the retardation of its action in releasing the toast holders.

It is to be understood that the said timing mechanism, while particularly applicable to toasters, is also applicable to other appliances in which it is desired to release an element from its working position under a predetermined retardation.

From the foregoing it becomes evident that the device is very simple and efficient and provides a device which accomplishes the objects described.

While it will be apparent that the illustrated embodiment of my invention herein disclosed is well calculated to adequately fulfill the objects and advantages primarily stated, it is to be understood that the invention is susceptible to variations, modification and change within the spirit and scope of the subjoined claims.

What I claim is:

1. In a device of the character described, the combination with a toast holder pivotally movable to and from a working position, of a latch member for retaining said holder in its working position, a spring urging said latch member to its release position, and a dash-pot retarding said spring in its action upon said latch member.

2. In a device of the character described, the combination with a toast holder, pivotally movable to and from a working position, of a latch member for retaining said holder in its working position, means tending to shift said latch member to its release position, and a dash-pot retarding the action of the last mentioned means upon the latch member.

3. In a device of the character described, a toast holder movable to and from a working position, means normally urging said holder from said position, a latch member for retaining said holder in said position, a reciprocatory rod for controlling said latch member, means acting upon the latch member through said rod tending to release the latch member, and a dash pot acting upon the rod and retarding its response to the last mentioned means.

4. In a device of the character described, a base, a pair of toast holders oppositely pivoted upon said base, for movement to and from their positions of use, a latch member engageable with both of said holders for retaining them in their positions of use, release means for said latch member, and a dash pot retarding said release means.

5. In a device of the character described, a base, a toast holder pivoted upon said base for movement to and from its working position, an upright carried upon said base, a keeper upon said upright, a latch member engaged in said keeper and movable in said keeper to either retain said holder in its working position or release the holder, a plunger rod exercising control of said latch member, means acting upon the latch member through said rod tending to release the latch member, and a dash pot retarding the action of the last mentioned means upon the latch member.

6. In a device of the character described, the combination with a toast holder pivotally movable to and from its working position, of a latch member for retaining said holder in its working position, release means for said latch member, and a dash pot retarding the action of said release means.

7. In a device of the character described, the combination with a base and a toast holder pivoted upon said base for movement to and from its working position, a latch member for retaining said toast holder in its working position, a spring for releasing said latch member, a dash pot for retarding the releasing action of said spring, and a rod adapted to seat said dash pot in its initial position and to simultaneously impress said spring.

In witness whereof I hereunto set my hand.

JENTJE MULDER.